United States Patent Office 3,156,225
Patented Nov. 10, 1964

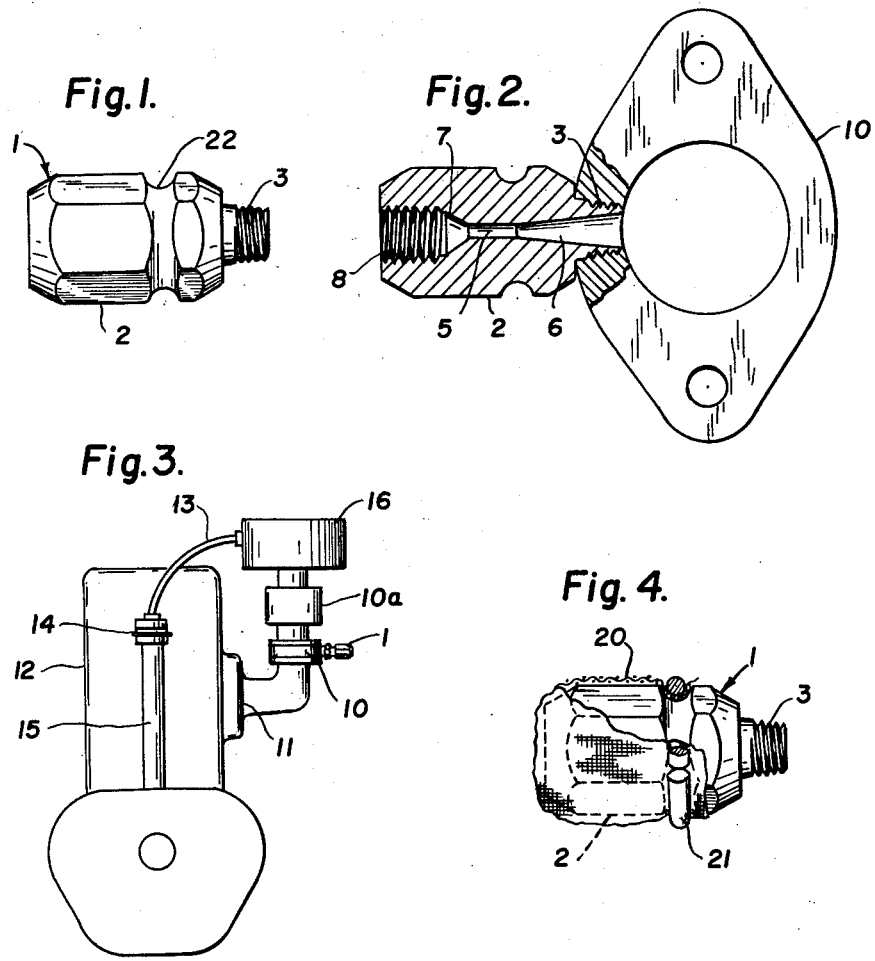

3,156,225
INTERNAL COMBUSTION ENGINE AND AUXILIARY MANIFOLD AIR INTAKE THEREFOR
William J. Linn, 1373 N. Sheridan Ave., Pittsburgh, Pa.
Filed Sept. 5, 1962, Ser. No. 221,631
5 Claims. (Cl. 123—119)

This invention relates to internal combustion engines utilizing carburetors, and is for a device for modulating the intake manifold pressure according to variations in the load conditions or speed changes in engine operation. Its purpose is to reduce fumes resulting from unburned gases and effect fuel economy and improve engine performance. It is a modification of the invention disclosed in my copending application Serial No. 75,504, filed December 13, 1960, now issued as Patent No. 3,059,628.

When an internal combustion engine, typically an automobile engine is operating there is a negative pressure or vacuum in the intake manifold which fluctuates widely with variations in speed and load conditions. For example, when an automobile is operating in traffic, the engine may be idling with the throttle plate closed and with a moderate degree of vacuum in the intake manifold. If traffic suddenly moves, the throttle may be suddenly opened and the engine speeded up. Then the throttle may be again quickly closed and the inertia of the engine will create a high vacuum in the manifold, leading to an excessive flow of gasoline with an inadequate supply of air, resulting in only partial oxidation of the fuel and a waste of fuel.

In my copending application above referred to I have disclosed a system for removing waste gases from the crank case or breather along with atmospheric air to partly relieve conditions resulting from such changes in pressure in the intake manifold. However, I have discovered that crank case gases can be better disposed of by the arrangement shown in my copending application Serial No. 173,387, filed February 15, 1962 and now abandoned wherein such gases are led to the air intake of the carburetor. This latter mentioned application, however, is ineffective to alleviate the objects above referred to.

According to the present invention I provide a fitting comprising a venturi through which atmospheric air alone is inducted into the air intake manifold of the engine between the engine and the carburetor. This fitting will provide definitely improved performance even if used alone, but is desirably used in connection with the arrangement disclosed in said application Serial No. 173,387 for reducing the overall production of engine smoke and objectionable gases. In some cases two or more of such fittings may be used.

The invention has for a principal object to provide an attachment or fitment of simple economical construction for application to an internal combustion intake between the carburetor and engine cylinders for modifying or reducing the undesirable effects of suction or negative pressure variations in the intake manifold and giving improved fuel economy and engine performance.

The invention may be more fully understood by reference to the accompanying drawings in which:

FIG. 1 is an elevation of the fitment detached from the engine;

FIG. 2 is a longitudinal section through the device shown in FIG. 1, the section being in the plane of line II—II of FIG. 1 and showing the fitment screwed into a piece at the base of the carburetor;

FIG. 3 is a schematic view showing the relation of this device to the engine along with the arrangement shown in my application Serial No. 173,387;

FIG. 4 is an elevation similar to FIG. 1 showing a replaceable screen over the inlet end of the device.

Referring first to FIGS. 1 and 2, the device preferably comprises unit 1 comprising an integral body having a central portion 2 of hexagonal or non-circular shape to facilitate the application of a wrench thereto. At one end it has a reduced exteriorly threaded nipple 3. Both ends of the main body may be chamfered as indicated at 4 to eliminate sharp corners.

Extending through the body and nipple is a contoured passage shaped to form a true venturi, there being a central or middle section 5 of minimum diameter, this section of the passage being of uniform diameter from end to end and the length of this portion of the passage is greater than the diameter of the passage. At the discharge end of the middle section the walls of the opening diverge at smooth gradual angles to the end of the nipple, this inner end portion of the passage being designated 6. It is longer than the portion 5 and at the outer end its diameter is about twice the minimum diameter at 5.

At the other end of the cylindrical middle passage 5 the passage flares out at 7 and a steep angle of the order of 45° into a cylindrical entering passage 8 of a diameter about as large as the maximum diameter of the passage at the opposite end; that is, about twice the diameter of the middle portion 5 of the passage. The interior of the portion 8 of the passage is internally threaded or otherwise provided with a series of ridges and valleys.

In use a threaded hole is tapped into the intake manifold and the nipple 3 of the fitment is screwed tightly into this hole. With average smaller engines this hole may be tapped through flange 10 where the manifold 11 bolts onto the bottom of the downdraft carburetor 10a, below the throttle plate where the carburetted air enters the manifold. However, in larger engines two or more of these fitments may be provided at spaced intervals along the manifold.

As indicated above, I prefer to use the fitment with an engine 12 having a sealed crank case with a tube 13 having a trap arrangement 14 at the top of the oil filler tube 15, this tube leading into the air cleaner 16, as described in my said application Serial No. 173,387.

In use the fitment provides a passage through which atmospheric air may enter the manifold between the carburetor and the engine. The carburetor is adjusted to idle with the fitment in place so that some atmospheric air is inducted through the fitment, increasing the air to fuel ratio beyond the throttle. Under idling conditions this inflow of air will normally be relatively small but it will be found that the engine will idle well with a leaner mixture. If the engine is speeded up the rate of air inflow through the fitment will naturally increase. If the throttle is then closed, as in the instance above noted, or where the automobile is going down grade and the throttle is closed, there may be sudden great increases in suction in the manifold. Air entering through the venturi will rapidly relieve this suction and the manifold pressure will be restored to a normal value without "hunting"; that is, without going past a normal level and then returning as it now does.

It would be supposed that a straight hole might be provided in place of this fitment but this is not so. Under normal idling conditions a small hole might pass sufficient air, but a hole small enough to give proper performance under these conditions would be too small for conditions above described, such as going down grade with the throttle closed or nearly closed or driving in traffic where there are short spurts with the throttle open followed by quick closing. A venturi, on the other hand, will give a much greater increase in the amount of air that it will pass in comparison with a straight hole with each increment of pressure drop in the manifold. The increase in air flow through a venturi will not be a uniform curve but will rise abruptly with a decrease in pressure in the manifold. Consequently, the venturi permits a limited influx of air to the manifold under normal idling, but will supply a great quantity where there is a sudden increase in vacuum in the manifold. In other words, it functions in a manner roughly comparable to a valve that provides a normally restricted flow but which can be opened to provide increased flow as the vacuum increases. An imperfect venturi could be used but a true one will provide much better performance.

The fitment here shown is about 1¼″ in overall length and the minimum diameter of the bore is about 3/32′, and is satisfactory for most ordinary automobile engines, but the optimum dimensions or number of these devices for larger engines must be determined by test, preferably by using a suction gauge on the manifold, as may be readily determined by one skilled in the art. Where a single device is used it is preferably installed as here shown close to the outlet side of the carburetor so that the incoming air will most effectively contact raw or wet gas that flows into the manifold as when the throttle plate is suddenly closed. With larger engines one may be placed at this location and one or more where the air flow may have a relatively lower velocity or where liquid fuel may tend to accumulate, such as near the ends of the manifold most remote from the carburetor.

I prefer also to have a removable and replaceable fine mesh screen over the entering end of the fitment. It is here shown in FIG. 4 as a cup-shaped body 20 of fine wire mesh having an expansible wire loop 21 at the free edge which may be retained in an annular groove 22 in the main body portion, as shown in FIG. 4.

Since the device aids in securing better combustion of fuel it complements the connection 13 for passing crank case gases to the air intake, thereby decreasing engine fumes and smoke, and since it is below the throttle plate while the connection 13 is in the air filter above the carburetor, this device admits required additional air when the closed throttle tends to retard flow of gases from the crank case, thus leaving out the "blow-by" gases at a time when connection 13 is least effective to dispose of them.

The internal threads or riffles at the inlet end 8 of the passage impart turbulence to the entering air and substantially eliminates any hissing, reduce reverberatory sounds and all whistling noise.

While I have shown and particularly described one preferred embodiment of my invention, it will be understood that the invention is not limited to the precise form and construction here shown.

I claim:

1. A fitment for use on the intake manifold of an internal combustion engine having a carburetor through which air and fuel are mixed for passage through the manifold comprising a body having a threaded nipple at one end adapted to be screwed into the manifold, the body having an axial passageway through it, the passageway having an entering end portion for air at the end remote from the nipple, the passage being completely closed between its ends whereby only ambient air from about the outer end of the fitment may pass therethrough the passageway forming a venturi extending between said entering end portion and the end of the discharge nipple.

2. A fitment for use on the intake manifold of an internal combustion engine having a carburetor through which air and fuel are mixed for passage through the manifold comprising a body having a threaded nipple at one end adapted to be screwed into the manifold, the body having an axial passageway through it, the passageway having an entering end portion for air at the end remote from the nipple, the passageway forming a venturi extending between said entering end portion and the end of the discharge nipple, said venturi being of true form having an intermediate cylindrical bore of minimum diameter and of a length exceeding its diameter, a gradually tapering bore increasing in diameter from the discharge end of the cylindrical bore toward the end of the nipple and of a length greater than the length of the intermediate bore to a maximum diameter about twice the diameter of the intermediate bore, there being a sharply flaring bore at the opposite end of the intermediate bore into the entering end portion of the passageway with the entering end portion being at least as large as the largest diameter of the tapering bore at the opposite end, the passageway being closed between its ends against the entrance of fluids of any kind therethrough so that only ambient air from outside the entering end may pass through the fitment.

3. A fitment as defined in claim 1 in which the entering end portion of the passageway has thread-like annular ridges and grooves to reduce noise from air entering the passageway.

4. The combination with an internal combustion engine having a curburetor and inlet manifold, of an auxiliary air inlet device opening into the manifold comprising a body having a nipple screwed into the manifold, the body and nipple having a passageway therethrough, the passageway defining an inwardly opening venturi, the outer end of the passageway opening only to the atmosphere and being completely closed intermediate its ends.

5. The combination with an internal combustion engine having a carburetor and inlet manifold, of an auxiliary air inlet device opening into the manifold comprising a body having a nipple screwed into the manifold, the body and nipple having a passageway therethrough, the passageway defining an inwardly opening venturi, the outer end of the passageway opening only to the atmosphere, the said passageway having an entering portion of a diameter at least as great as the inner end of the venturi and having riffled walls to suppress the generation of noise, the passageway being closed between its ends against the entrance of fluids of any kind therethrough so that only ambient air from outside the entering end may pass through the fitment.

References Cited in the file of this patent
UNITED STATES PATENTS

| | | |
|---|---|---|
| 1,214,322 | Kirby | Jan. 30, 1917 |
| 1,662,101 | Bossi | Mar. 13, 1928 |

FOREIGN PATENTS

| | | |
|---|---|---|
| 100,280 | Switzerland | July 16, 1923 |
| 100,282 | Switzerland | July 16, 1923 |